United States Patent
Tanaka et al.

(10) Patent No.: US 6,630,534 B1
(45) Date of Patent: Oct. 7, 2003

(54) POLYURETHANE PASTE COMPOSITION AND SEALING MATERIAL

(75) Inventors: Keiji Tanaka, Kyoto (JP); Toshihiko Kinsho, Kyoto (JP); Takashi Yabuta, Kyoto (JP); Keiichi Yokouchi, Toyota (JP); Takao Nomura, Toyota (JP)

(73) Assignees: Sanyo Chemical Industries, Ltd., Kyoto (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/541,056

(22) Filed: Mar. 31, 2000

(30) Foreign Application Priority Data

Apr. 1, 1999 (JP) .............................. 11-095206
Feb. 25, 2000 (JP) ....................... 2000-048677

(51) Int. Cl.$^7$ ................. C08L 75/04; C08L 75/02; C09D 175/02; C09D 175/04; C08J 3/18; C08J 3/20

(52) U.S. Cl. .................. 524/590; 524/59; 524/64; 524/127; 524/167; 524/211; 524/284; 524/292; 524/296; 524/297; 524/298; 524/356; 524/369; 524/425; 524/439; 524/442; 524/445; 524/447; 524/450; 524/451; 524/452; 524/487; 525/123; 525/127; 525/128; 525/129; 525/130; 525/424; 525/440; 525/455; 525/457; 428/402; 428/423.1; 523/218; 523/219; 528/45; 528/49; 528/59; 528/61; 528/74.5

(58) Field of Search ................. 524/127, 292, 524/296, 297, 298, 369, 590, 425, 447, 445, 439, 451, 452, 487, 442, 59, 64, 167, 211, 284, 356, 450; 525/123, 127, 128, 129, 130, 424, 440, 455, 457; 528/45, 48, 59, 61, 74.5; 428/402, 423.1; 523/218, 219

(56) References Cited

U.S. PATENT DOCUMENTS

| 4,248,918 A | * | 2/1981 | Hornibrook et al. ........... 428/40 |
| 4,482,664 A | | 11/1984 | Blum et al. .................. 524/212 |
| 5,087,664 A | * | 2/1992 | Sugino et al. ............... 525/124 |
| 5,091,455 A | * | 2/1992 | Blank et al. ................. 524/297 |
| 5,130,402 A | * | 7/1992 | Akiyama et al. .............. 528/45 |
| 5,298,128 A | * | 3/1994 | Hausdorf et al. .............. 203/47 |
| 5,571,623 A | * | 11/1996 | Kuriyama et al. ........... 428/463 |
| 5,725,867 A | * | 3/1998 | Mixon ......................... 424/402 |
| 5,906,704 A | * | 5/1999 | Matsuura et al. ......... 156/331.4 |
| 5,906,823 A | * | 5/1999 | Mixon ......................... 424/402 |

FOREIGN PATENT DOCUMENTS

| JP | 50-24989 | 8/1975 |
| JP | 58-132016 | 8/1983 |
| JP | 4/255755 | 9/1992 |
| JP | 06299065 | 10/1994 |
| JP | 07133423 | 5/1995 |
| JP | 08020697 | 1/1996 |
| JP | 08120041 | 5/1996 |
| JP | 10231409 | 9/1998 |

* cited by examiner

Primary Examiner—Rabon Sergent
(74) Attorney, Agent, or Firm—Finnegan, Henderson, Farabow, Garrett & Dunner, L.L.P.

(57) ABSTRACT

Disclosed is a composition useful as a sealing or undercoating material for automobiles. The composition comprises fine particles (A) comprising polyurethane resin, a plasticizer (B) and fillers (C), wherein not less than 50% of (A) is spherical particles having a ratio of major axis/minor axis in the range of 1.0 to 1.5.

24 Claims, No Drawings

POLYURETHANE PASTE COMPOSITION AND SEALING MATERIAL

FIELD OF THE INVENTION

This invention relates to a polyurethane paste composition applied mainly onto vehicles. This invention relates in particular to a polyurethane paste composition which is endowed with excellent fluidity or a certain shape retainability at ordinary temperature and can be easily hardened (swollen and formed integral) upon heating. Furthermore, the composition is excellent in physical properties of its hardened product, such as adhesion strength, low-temperature flexibility, chemical resistance and mechanical strength.

BACKGROUND ART

As it is known, prior to finish coating, a sealing composition has been applied onto a joint between steel plates or an edge of a steel plate in an automobile body after electro-deposition coating to make that portion water- and air-tight and to improve rust prevention. Also, in order to improve rust resistance and chipping resistance, an undercoating composition has been applied onto a lower floor part, a foil house, a side sill etc. in the automobile body.

As the sealing or undercoating composition, ① so-called vinyl chloride-based plastisol composition prepared by plasticizing crystalline resin powder such as vinyl chloride resin, vinylidene chloride resin etc. with a phthalate-based plasticizer and then incorporating suitable fillers and other additives (e.g., JP-A 08-020697) is used in many cases because of its excellent rust prevention, easy formation of a thick film and low costs. Also, ② so-called one-pack blocked polyurethane composition prepared by blending blocked polyisocyanate with active hydrogen compounds such as polyamine, polyamide and polyol (e.g., JP-A 6-299065) is generally used when coating appearance and coating strength are regarded more important. As non-vinyl-chloride sealing composition, there is ③ so-called acrylic resin-based plastisol composition comprising acrylic resin-based resin powder, a plasticizer, fillers and other additives (e.g., JP-A 10-231409).

However, the composition ① has the problem of low adhesion on a metal and an electro-deposited surface because of high crystallinity of vinyl chloride-based resin. Further, environmentally deteriorating substances such as Pb, Cr etc. are used as aging-preventing agents to stabilize a hardened product for a prolonged period of time. The composition ② should be stored at low temperature because of its poor storage stability. when it is attempted to achieve desired setting properties and mechanical strength, the prepolymer should be highly polymerized or the cohesive force between prepolymer molecules should be raised. By doing so, however, the viscosity is raised and use of a solvent, a plasticizer and a reactive diluent is inevitable, resulting in failing to achieve sufficient thixotropy thus permitting sagging to occur easily. ③ has the problem of insufficient strength at ordinary temperature when the Tg of the resin is decreased in order to raise flexibility at low temperature.

SUMMARY OF THE INVENTION

An object of the present invention is to provide a polyurethane paste composition which is a product excellent in workability in the form of sol having excellent paste fluidity at ordinary temperature and can be endowed with a certain shape retainability by addition of a shape-retaining agent. Another object is to provide a polyurethane paste composition which can be easily hardened by heating. An additional object is to provide a polyurethane paste composition excellent in adhesiveness, mechanical strength and low-temperature flexibility of its hardened product. A still other object is to provide a polyurethane paste composition which is excellent in storage stability in the state of a paste and highly safe for the environment.

That is, the present invention relates to a polyurethane paste composition comprising fine particles (A) consisting of polyurethane resin, a plasticizer (B) and fillers (C). Hereinafter, the present invention is described in detail.

The fine particles (A) in the present invention are composed of urethane resin and thus have a microphase-separated structure consisting of hard and soft segments unique to urethane resin. Accordingly, they are excellent in storage stability at ordinary temperature due to strong aggregation of hard segments. Moreover, their high strength can also be maintained after thermosetting. The plasticization thereof by a plasticizer is directed mainly to their soft segments, to make the Tg of a hardened product sufficiently low and to improve flexibility at low temperature.

Besides, the viscosity of the composition depends on interaction in the interface among the fine particles (A), the fillers (C) and the plasticizer (B) so that even if the prepolymer is highly polymerized or the cohesive force between prepolymer molecules is raised, physical properties of its hardened product, such as adhesion strength, chemical resistance and mechanical strength, can be improved while maintaining the rheologidal characteristics of the composition at ordinary temperature without raising the viscosity thereof.

The composition of the present invention is useful as a sealing or undercoating composition for automobiles and as a sealing material, putty and joint compounds in the fields of civil engineering and architecture. Further, when the product of the present invention is used as a sealing material for automobiles, this sealing material easily burns up for recycling, thus improving the recycling performance of the body.

DETAILED DESCRIPTION OF THE INVENTION

The method of producing the polyurethane resin according to the present invention is not restricted in particular, and known method can be used. The polyurethane resin is, for example, formed by reacting an isocyanate group-terminated urethane prepolymer (a) derived from an excess polyisocyanate (a1), a high-molecular weight diol (a2) having a number average molecular weight of 100 to 10,000 and, optionally, a low-molecular weight diol (a3) with an aliphatic diamine (b1) and a mono- or di-alkanolamine (b2) containing 2 to 4 carbon atoms in the hydroxyalkyl group or an aliphatic monoamine (b3).

The aforesaid polyisocyanates (a1) include:
① aliphatic diisocyanates with 2 to 18 carbon atoms (except the carbons in the NCO group, similarly hereinafter), e.g., ethylene diisocyanate, tetramethylene diisocyanate, hexamethylene diisocyanate (hereinafter referred to as HDI), dodecamethylene diisocyanate, is 2,2,4-trimethylhexamethylene diisocyanate, lysine diisocyanate, 2,6-diisocyanatomethyl caproate, bis(2-isocyanatoethyl)fumarate, bis(2-isocyanatoethyl) carbonate, 2-isocyanatoethyl-2,6-diisocyanatohexanoate, and the like;

② alicyclic diisocyanates with 4 to 15 carbon atoms, e.g., isophorone diisocyanate (hereinafter referred to as IPDI), dicyclohexylmethane-4,4'-diisocyanate (hereinafter referred to as hydrogenated MDI), cyclohexylene diisocyanate, methyl cyclohexylene diisocyanate (hereinafter referred to as hydrogenated TDI), bis(2-isocyanato ethyl)-4-cyclohexene, and the like;

③ aromatic polyisbcyanates with 6 to 14 carbon atoms, e.g., 1,3- and/or 1,4-phenylene diisocyanate, 2,4 -and/or 2,6-tolylene diisocyanate(hereinafter referred to as TDI), crude TDI, 2,4'-and/or 4,4'-diphenylmethane diisocyanate(hereinafter referred to as MDI), 4,4'-diisocyanato biphenyl, 3,3'-dimethyl-4,4'-diisocyanato biphenyl, 3,3'-dimethyl-4, 4'-diisocyanato diphenylmethane, crude MDI, 1,5-naphthylene diisocyanate, and the like;

④ araliphatic isocyanate with 8 to 15 carbon atoms, e.g., m- and/or p-xylylene diisocyanate (hereinafter referred to as XDI), α,α,α',α'-tetramethyl xylylene diisocyanate (hereinafter referred to as TMXDI), and the like;

⑤ modified polyisocyanates from these, e.g., modified diisocyanates having a carbodiimide group, an urethodione group, an urethoimine group or an urea group; and ⑥ mixtures of two or more of those compounds.

Among these compounds, preferred are ② alicyclic polyisocyanates and ③ aromatic polyisocyanates, particularly IPDI hydrogenated MDI, MDI, XDI and TMXDI.

Suitable high molecular weight diols (a2) include polyester diols (a21), polyether diols (a22), polyether ester diols (a23), and mixtures (a24) of two or more of those compounds.

As the aforesaid polyester diol (a21) can be cited: (a211) condensation polymerizates between a low molecular weight diol and a polycarboxylic acid or its ester-forming derivative (acid anhydride, lower alkyl ester with one to 4 carbon atoms, acid halide, and the like); (a212) ring opening polymerizates of a lactone monomer with a low molecular weight diol as initiator; and (a213) mixtures of two or more of those compounds.

The aforesaid low molecular weight diol (a211) usually has a molecular weight of 40–about 500. Examples of such diol include: aliphatic diols [linear ones such as ethylene glycol, diethylene glycol, 1,3-propanediol, 1,4-butanediol, 1,5-pentanediol, 1,6-hexanediol, 1,8-octanediol and the like, branched ones such as propylene glycol, neopentyl glycol, 3-methyl-1,5-pentanediol, 2,2-diethyl-1,3-propanediol, 1,2-butanediol, 1,3-butanediol, 2,3-butanediol and the like]; diols that contain cyclic group [ones described in Japanese-Patent Publication No.S45-1474, 1,4-bis(hydroxymethyl) cyclohexane, m-xylylene glycol, p-xylylene glycol, ethylene oxide or propylene oxide adduct of bisphenol A having a molecular weight less than 500 and the like] and mixtures of two or more of those compounds.

Of these compounds preferable are ethylene oxide or propylene oxide adduct of bisphenol A.

Examples of the polycarboxylic acid or its ester-forming derivative in aforesaid (a211) include aliphatic polycarboxylic acids with 4 to 15 carbon atoms such as succinic, adipic, sebacic, glutaric, azelaic, maleic and fumaric acids; aromatic polycarboxylic acids with 8 to 12 carbon atoms such as terephthalic and isophthalic acids; their ester-forming derivatives such as acid anhydrides, lower alkyl esters (e.g., dimethyl ester, diethyl ester), acid halides (e.g., acid chloride); and mixtures of two or more of these compounds.

Examples of the lactone monomer in aforesaid (a212) include γ-butyrolactone, ε-caprolactone, γ-valerolactone and mixtures of two or more of these compounds.

As the aforesaid polyether diol (a22) can be cited ones with alkylene oxide added to a dihydroxyl compound such as the aforesaid low molecular weight diol and dihydric phenols.

Among the dihydric phenols are bisphenols, e.g., bisphenol A, bisphenol F and bisphenol S, and monocyclic phenols e.g., catechol and hydroquinone.

Suitable alkylene oxides include ones containing 2–8 carbon atoms, for example, ethylene oxide (hereinafter, referred to as "EO"), propylene oxide (hereinafter, referred to as "PO"), 1,2-butylene oxide, 1,3-butylene oxide, 1,4-butylene oxide, 2,3-butylene oxide, styrene oxide, α-olefin oxide with 5 to 10 or more carbon atoms, epichlorohydrin, and combinations of two or more of these compounds, which may be added blockwise and/or randomwise.

Of those polyether diols (a22), preferable are ones with alkylene oxide added to a low molecular weight diol, and more preferable ones with PO added to an aliphatic diol.

As the aforesaid polyetherester diol (a23) can be cited condensation polymerizates between one or more types selected from the aforesaid polyether diols and one or more types selected from the polycarboxylic acids or their ester-forming derivatives cited as the raw materials for the aforesaid polyester diols.

Of those high molecular weight diols (a2), preferable are polyester diols, and more preferable condensed polyester diols derived from one or more types among ones with alkylene oxide added to a low molecular weight diol and one or more types among polycarboxylic acids, still more preferable polyester diol derived from alkylene oxide adduct of bisphenol A and terephthalic acid.

The number average molecular weight of (a2) is generally 300 to 10,000, and preferably 500 to 5,000, and more preferably 1,000 to 3,000, in view of elongation and mechanical strength of the hardened article.

It is possible to use the compounds cited as starting materials for the aforesaid polyester diols as the low molecular weight diol (a3) in combination with (a2) as necessary. Suitable as (a3) are aliphatic diols.

The molar ratio of the respective constituent parts making up the NCO-terminated urethane prepolymer (a) to 1 mole of (a1) is this: (a2) generally 0.1 to 0.6 mole, and preferably 0.2 to 0.5 mole; (a3) generally 0 to 0.2 mole, and preferably 0.05 to 0.10 mole.

The content of free isocyanate group in the urethane prepolymer (a) is generally 0.5 to 10 wt %, preferably 1.5 to 6 wt %.

Said polyurethane resin is obtainable by reacting the aforesaid NCO-terminated urethane prepolymer (a) with an aliphatic diamine (b1) and a mono- or di-alkanolamine (b2) containing 2 to 4 carbon atoms in the hydroxylalkyl group or a aliphatic monoamine (b3).

Suitable an aliphatic diamine (b1) include cycloaliphatic diamines such as 4,4'-diamino-3,3'-dimethyl dicyclohexylmethane, 1,4-diaminocyclohexane, isophoronediamine; aliphatic diamines such as ethylenediamine, hexamethylenediamine; and araliphatic diamines such as xylylenediamine, α,α,α,α-tetramethylxylylenediamine. Among these compounds preferred are alicyclic diamines and aliphatic diamines, particularly isophoronediamire and hexamethylenediamine.

Suitable mono- or di-alkanolamines (b2) include monoalkanolamines with 2 to 4 carbon atoms such as monoethanolamine, monopropanolamine, and the like; dialkanolamines with two to 4 carbon atoms such as diethanolamine, dipropanolamine, and the like; and mixtures of two or more of these compounds. Among these compounds, preferred are dialkanolamines, and particularly diethanolamines and dipropanolamine.

Suitable aliphatic monoamine (b3) include alicyclic monoamines such as cyclopentylamine, cyclohexylamine and the like; aliphatic monoamines such as methylamine, ethylamine, propylamine, butylamine, octylamine, 2-ethylhexylamine, nonylamine, oleylamine, N-methylbutylamine, diethylamine, dibutylamine and the like; and mixtures of two or more of these compounds.

Among these compounds, preferred are aliphatic monoamines, particularly butylamine, octylamine, 2-ethylhexylamine and dibutylamine.

In the above reaction for formation of polyurethane resin consisting (A), an equivalent ratio of (b1) to one equivalent of the isocyanate group of the NCO-terminated urethane prepolymer (a) is usually from 0.2 to 0.98, and preferably from 0.5 to 0.95, while an equivalent ratio of (b2) or (b3) is usually from 0.02 to 0.2, and preferably from 0.05 to 0.15.

The polyurethane resin in the present invention contains urea bonds, and the ratio of urea bonds/urethane bonds in the resin is preferably from 9/1 to 1/10.

The shape of the fine particles (A) in the present invention may be either unsettled or spherical, but in respect of paste fluidity at ordinary temperature and setting properties upon thermosetting, preferably not less than 50% of (A) is spherical particles. Here, the "spherical" particles refer to those having a ratio of major axis/minor axis in the range of 1.0 to 1.5.

From the viewpoint of paste storage stability and setting properties, the average particle diameter of the fine particles (A) in the present invention is usually 0.1 to 200 $\mu$m, preferably 1 to 100 $\mu$m and particularly preferably 1 to 50 $\mu$m.

The method of producing the fine particles (A) used in the present invention is not specifically limited but includes, for example, the following methods:

① method of grinding blocked or pelletized the polyurethane resin using a method such as freeze-grinding method or icing-grinding method, thereby to obtain a powder of the polyurethane resin;

② method of forming a nonaqueous dispersion of the polyurethane resin in an organic solvent which does not dissolve the polyurethane resin (e.g. n-hexane, cyclohexane, n-heptane, etc.) and separating the fine particles (A) from the non-aqueous dispersion with drying, thereby to obtain a powder of the polyurethane resin (e.g. method described in Unexamined Japanese Patent Publication No. H04-255755, etc.); and ③ method of forming a water dispersion of the polyurethane resin in water containing a dispersant and separating the fine particles (A) from the water dispersion with drying, thereby to obtain a powder of the polyurethane resin (e.g. methods described in Unexamined Japanese Patent Publication Nos. H07-133423 and H08-120041).

Among them, the method of ③ is preferred in that a powder having a desired shape and particle size can be obtained without using a large amount of the organic solvent.

In the method of ① unlike the prepolymer method described above, polyurethane resin obtained by reacting the polyisocyanate (a1) with the high molecular weight diol (a2) and the low molecular weight diol (a3) all at once (one-shot process) can be used.

In the method of ③, fine particles consisting of polyurethane resin can be obtained by reacting the NCO-terminated urethane prepolymer (a) in an aqueous medium with an extension agent and if necessary with a terminator and a crosslinking agent.

The extension agent includes an aliphatic diamine (b1) and a blocked product of (b1). A blocked product of (b1) is preferred.

The blocking agent includes C3 to C8 ketones (acetone, methyl ethyl ketone, methyl isobutyl ketone etc.).

The terminator includes a monoamine (b2) and an aliphatic monoamine (b3) having 1 or 2 alkanol groups each containing 2 to 4 carbon atoms.

The crosslinking agent includes tri- to hexavalent polyamines (diethylene triamine, triethylene tetramine).

The ratio of the equivalent of the extension agent to 1 equivalent of the isocyanate group of urethane prepolymer (a) is usually 0.2 to 0.98, preferably 0.5 to 0.95; the ratio of equivalent of the terminator thereto is usually 0 to 0.2, preferably 0.05 to 0.15; and the ratio of the equivalent of the crosslinking agent thereto is usually 0 to 0.05, preferably 0 to 0.02.

The number average molecular weight (measured by GPC; hereinafter referred to as Mn) of polyurethane resin consisting (A) is generally 1,000 to 200,000, and preferably 10,000 to 100,000 in view of melt viscosity in hardening.

The heat-softening point of polyurethane resin consisting (A) is from generally 80 to 250° C., and preferably from 100 to 200° C., and more preferably from 140 to 180° C. in view of paste storage stability and setting properties.

The term "heat-softening point" used in the present specification can be measured by using a needle insertion type thermomechanical analysis (TMA).

The glass transition point (Tg) of polyurethane resin consisting (A) is generally from −100 to 200° C., and preferably from −30 to 150° C., and more preferably from 30 to 120° C. Tg mentioned here can be determined by, e.g., differential scanning calorimeter (DSC).

The solubility parameter (hereafter, reffered to as "SP") of polyurethane resin consisting (A) is generally from 8 to 13, and preferably from 9 to 12. It is noted that the SP can be obtained by procedure described in "Polymer Engineering and Science, Vol.14, No.2, p.147–154(1974)".

The plasticizers (B) suitable in the present invention are not restricted but include:

phthalic acid esters (B1), e.g., dibutyl phthalate (SP: 9.4, mp: −35° C.), dioctyl phthalate (SP: 8.9, mp: −55° C.), butyl benzyl phthalate (SP: 10.7, mp: −40° C.) di-isodecyl phthalate (SP: 8.2, mp: −21° C.);

aliphatic dibasic acid esters (B2), e.g., di-2-ethyl hexyl adipate (SP: 8.6, mp: −70° C.), 2-ethyl hexyl sebacate (SP: 8.6, mp: −62° C.)

trimellitate esters (B3), e.g., tri-2-ethyl hexyl trimellitate (SP: 9.5, mp: −30° C.)

phosphoric acid esters (B4), e.g., tri-2-ethyl hexyl phosphate (SP: 9.2, mp: −70° C.), tricredyl phosphate (SP: 9.9, mp: −35° C.), 2-ethyl hexyl diphenyl phosphate (SP: 10.0, mp: −54° C.);

polyalkyl ether benzoic acid diesters (B5), e.g., polyethylene glycol dibenzoate (SP: from 10.9 to 10.4), polypropylene glycol dibenzoate (SP: from 10.2 to 9.0); and mixtures (B6) of two or more of these compounds (B1) to (B5).

Among these compounds, preferred are phthalic acid esters (B1), phosphoric acid esters (B4) and polyalkylether benzoic acid diester.

The difference between (B) and polyurethane resin consisting (A) in SP is generally not larger than 2.5, and preferably not larger than 2.0, in view of the compatibility between (B) and polyurethane resin consisting (A).

The melting point of (B) is generally not higher than 0° C., preferably from −30 to −50° C. or lower, in view of the flowability at low temperature.

Examples of fillers (C) in the present invention include heavy calcium carbonate, light calcium carbonate, kaolin, talc, mica, bentonite, clay, sericite, asbestos, glass fiber, carbon fiber, aramid fiber, nylon fiber, acrylic fiber, glass powder, glass balloon, ceramic balloon, shirasu balloon, coal powder, acrylic resin powder, phenol resin powder, epoxy resin powder, metal powder, ceramic powder, zeolite, slate powder, and asphalt powder.

The quantities of (B) and (C) to be used in the polyurethane paste composition of the present invention per 100 parts, by weight, of (A) are: (B) generally 50 to 300 parts by weight, and preferably 50 to 200 parts by weight; (C) generally 1 to 300 parts by weight, and preferably 50 to 200 parts by weight.

For the purpose of improving the strength of the resin after curing, blocked polyisocyanate (D) can be added if necessary to the paste composition of the present invention. The aforesaid (D) consists of a polyisocyanate (d1) and a blocking agent (d2).

As the aforesaid (d1), mention is made of at least one polyisocyanate selected from the polyisocyanates exemplified as the aforesaid (a1) and modifications thereof (for example, modifications having isocyanurate group, biuret group, carbodiimide group etc.).

The number of isocyanate groups in the aforesaid (d1) is usually 2 or more, preferably 3 to 4. The aforesaid (d1) is preferably a modified isocyanurate from isophorone diisocyanate, a modified isocyanurate from hexamethylene diisocyanate and a modified biuret from hexamethylene diisocyanate.

The aforesaid (d2) includes oximes [acetoxime, methyl isobutyl ketoxime, diethyl ketoxime, cyclopentanone oxime, cyclohexanone oxime, methyl ethyl ketoxime etc.]; lactams [γ-butyrolactam, ε-caprolactam, γ-valerolactam etc.]; C1 to C20 aliphatic alcohols [ethanol, methanol, octanol etc.]; phenols [phenol, m-cresol, xylenol, nonylphenol etc.]; active methylene compounds [acetyl acetone, ethyl malonate, ethyl acetoacetate etc.]; basic nitrogenous compounds [N,N-diethylhydroxylamine, 2-hydroxypyridine, pyridine N-oxide, 2-mercaptopyridine etc.]; and mixtures thereof.

Among these, oximes are preferable among which methyl ethyl ketoxime is particularly preferable.

The quantity of (D) to be used in the polyurethane paste composition of the present invention per 100 parts, by weight, of (A) is generally 0 to 20 parts by weight, and preferably 5 to 15 parts by weight.

The paste composition of the present invention can be mixed, as necessary, with pigment (E). The pigments (E) are not restricted in particular, and known organic pigments and/or inorganic pigments can be used.

Among the suitable organic pigments are, for example, insoluble azo pigments, soluble azo pigments, copper phthalocyanine pigments and quinacridone pigments. The inorganic pigments include, for example, chromates, ferrocyanide compounds, metal oxides, sulfide selenium compounds, sulfate, silicate, carbonate, phosphate, metallic powder and carbon black.

The quantity of (E) to be used in the polyurethane paste composition of the present invention per 100 parts, by weight, of (A) is generally 0 to 5 parts by weight, and preferably 1 to 3 parts by weight.

The paste composition of the present invention can be mixed, as necessary, with known additives (blocking inhibitor, releasing agent, light stabilizer, thermal stabilizer, flame retarder, water absorbent and the like).

The following methods of preparing the polyurethane paste composition of the present invention are given by way of example, but not limited thereto by any means.

①: A powder of (A), (B) and (C) are blended in a lump in a mixer.

②: (A) and (B) are first blended, and then mixed with (C).

③: At an optional stage during the production of (A), (B) and part or all of (C) are previously contained.

Producing apparatuses which are used in preparing the paste composition of the present invention are not restricted in particular, and known mixers and dispersing apparatuses can be used. Among such mixing and dispersing apparatuses are the high-speed shear type as Henschel mixer, the low-speed type as Nauta mixer and planetary mixer, bead mill, three rolls and the like.

In addition, an anionic, cationic or nonionic dispersant can be used if necessary.

Upon heating of the paste composition of the present invention, fine resin particles become swollen by absorbing the plasticizer and integrated with the fillers to form a hardened product.

The Tg of the hardened product is usually −70° C. to 10° C., preferably −70° C. to −30° C.

The paste composition of the present invention is used as a sealing material for an automobile body, mechanical parts etc. Usually, it is used as a product in the form of sol having desired fluidity at ordinary temperature, but for use in e.g. a mohican part (a joint part of the roof and the side) in an automobile where sagging upon heating is problematic, a shape retaining agent may be used in combination, or the paste composition can be impregnated into a support (nonwoven fabric, paper, fiber, film etc.) and formed into a roll, tape or sheet for use.

When the composition of the present invention is a product in the form of sol having fluidity at ordinary temperature, it can be adjusted to have suitable viscosity depending on utilities and purpose, and generally its viscosity at 25° C. is preferably 5,000 cP to 300,000 cP.

As the shape retaining agent, thermoplastic resin (F) and crystalline compound (G) which is solid at ordinary temperature and is rapidly softened by heating at 80° C. or more can be incorporated. Shape retainability at ordinary temperature is preferably 20 or more in terms of hardness (JIS A) at 25° C.

(F) is not particularly limited insofar as it can be mixed and dispersed in the other materials used, and examples include resins of addition polymerization type, polycondensation type, polyaddition type and ring-opening polymerization type.

The addition polymerization-type resin includes polyethylene, polypropylene, polystyrene, poly-p-xylylene, polyacrylate, polymethacrylate, polyvinyl chloride, polyvinylidene chloride, polyvinyl acetate, fluorine resin, polyacrylonitrile, polyvinyl ether and diene-type polymers such as polybutadiene, as well as copolymers thereof.

The polycondensation-type resin includes polyamide, thermoplastic polyester, polycarbonate, polyphenylene oxide, polysulfone etc., and the polyaddition-type resin includes thermoplastic polyurethane etc. The ring-opening polymerization-type resin includes polymers of alkylene oxides such as ethylene oxide, propylene oxide and tetrahydrofuran, as well as polyacetal etc.

(G) includes waxes such as paraffin wax, microcrystalline wax, polymerized wax, low-molecular-weight polyethylene, low-molecular-weight polypropylene, modified wax, beeswax, spermaceti and carnauba wax, polybasic acids such as dodecanoic diacid, pyromellitic acid and trimellitic acid, and acid anhydrides thereof and polyvalent metal salts, as well as dimethyl sulfone, camphor, urea etc.

The quantities of (F) and (G) to be used in the polyurethane paste composition of the present invention per 100 parts, by weight, of (A) are: (F) generally 0 to 300 parts by weight, and preferably 50 to 200 parts by weight; (G) generally 0 to 200 parts by weight, and preferably 10 to 100 parts by weight.

DESCRIPTION OF THE PREFERRED EMBODIMENTS

Now the present invention will be described in more detail by the following examples but is by no means restricted thereto. In the following description, it is understood, part or parts mean part or parts by weight and percent denotes percent by weight.

Production Example 1

900 parts of bisphenol A terephthalate having a Mn of 2000 and a hydroxyl value of 56 to which 2 mol polypropylene oxide had been added was introduced into a reaction vessel and dehydrated at 140° C. for 2 hours under reduced pressure, then 1100 parts of ethyl acetate (diluent) and 250 parts of MDI were added thereto, and the mixture was reacted at 80° C. for 10 hours whereby an isocyanate group-terminated urethane resin (referred to as "prepolymer (a)") was obtained. The content of the isocyanate group in prepolymer (a) was 1.8%.

20 parts of polyvinyl alcohol (PVA-235, Kuraray Co., Ltd.) and 700 parts of water were introduced into another vessel, stirred and dissolved to give a PVA solution (X). Then, 300 parts of urethane prepolymer (a) were introduced into it and mixed for 1 minute at a revolution rate of 10,000 rpm with an Ultra Disperser (Yamato Kagaku; hereinafter, this same disperser was used) to give a dispersion.

This dispersion was transferred to another reaction vessel, and 12 parts of isophorone diamine and 1 part of dibutyl amine were introduced into it, and the mixture was reacted at 50° C. for 10 hours. After reaction, the product was filtered off and dried to give fine urethane resin particles A. The Mn of the fine urethane resin particles A (determined by GPC; hereinafter, this same technique was used to determine Mn) was 40,000, the Tg (determined by DSC; this same technique was used for measurement of Tg) was 90° C., the SP value was 11.7, the average particle diameter was 60 μm, and the ratio of spherical particles having a ratio of major axis/minor axis in the range of 1.0 to 1.5 was 99% (observed under a microscope; hereinafter measured in the same manner).

Production Example 2

160 parts of polypropylene glycol having a Mn of 400 and a hydroxyl value of 280 (Sunnix PP-400, a product of Sanyo Chemical Industries, Ltd.) was introduced into a reaction vessel and dehydrated at 140° C. for 2 hours under reduced pressure, then 40 parts of ethyl acetate (diluent) and 20 parts of MDI were added thereto, and the mixture was reacted at 80° C. for 10 hours whereby an isocyanate group-terminated urethane resin (referred to as "prepolymer (b)") was obtained. The content of the isocyanate group in prepolymer (b) was 8.0%.

200 parts of urethane prepolymer (b) was introduced into 720 parts of the PVA solution (X) and mixed for 1 minute at a revolution rate of 10,000 rpm with the Ultra Disperser to give a dispersion.

This dispersion was transferred to another reaction vessel, and 30 parts of isophorone diamine, then 1 part of dibutyl amine were introduced into it and the mixture was reacted at 80° C. for 10 hours. After reaction, the product was filtered off and dried to give fine urethane resin particles B. The Mn of the fine urethane resin particles B was 45,000, the Tg was 65° C., the SP value was 11.1, the average particle diameter was 80 μm, and the ratio of spherical particles having a ratio of major axis/minor axis in the range of 1.0 to 1.5 was 99%.

Production Example 3

12 parts of acetone (blocking agent) was added to 12 parts of iosphorone diamine in a reaction vessel and reacted at 40° C. for 8 hours to give a ketimine (phonetic) compound of isophorone diamine. One part of dibutyl amine and 300 parts of urethane prepolymer (a) (see Production Example 1) were introduced into this reaction vessel and then mixed, and 720 parts of the PVA solution (X) was added thereto, followed by being mixed for 1 minute at a revolution rate of 10,000 rpm with the Ultra Disperser to give a dispersion. This dispersion was reacted at 80° C. for 10 hours. After reaction, the product was filtered off and dried to give fine urethane resin particles C. The Mn of the fine urethane resin particles C was 50,000, the Tg was 95° C., the SP value was 11.7, the average particle diameter was 40 μm and the ratio of spherical particles having a ratio of major axis/minor axis in the range of 1.0 to 1.5 was 99%.

Production Example 4

200 parts of mixed monomers consisting of octadecyl methacrylate/styrene (40 weight-%/60 weight-%) were added dropwise at 100° C. for 2.5 hours to a reaction vessel containing 300 parts of xylene and 5 parts of azobisisobutyronitrile, during which the monomers were polymerized and then aged at 150° C. for 2 hours. The xylene and the remaining monomers were distilled off at 150° C. under reduced pressure whereby vinyl thermoplastic resin D with a Mn of 30,000 was obtained.

Comparative Example 1

273 parts of dicyclohexylmethane-4,4'-diisocyanate, 208 parts of polytetramethylene glycol (Mn: 1,000), 28 parts of trimethylolpropane (molecular weight: 134) and 400 parts of an aromatic solvent (Pegazole R-100TM, Mobil Sekiyu K.K.) were reacted at 90° C. for 8 hours in a nitrogen stream to give an isocyanate group-terminated urethane resin (referred to as "prepolymer (d)").

The content of the isocyanate group in prepolymer (d) was 4.8%.

Then, 91 parts of methyl ethyl ketoxime was added thereto and reacted at 60 to 80° C. for 2 hours, and it was confirmed by an infrared absorption spectrum that the isocyanate group disappeared. Blocked polyisocyanate E (solid content: 60%) was obtained in this manner.

Examples 1 to 4 and Comparative Examples 1 to 3

Preparation of Compositions

Polyurethane paste compositions in Examples 1 to 4 in the present invention and compositions in the Comparative Examples 1 to 3 were prepared respectively by uniformly mixing the materials (parts by weight) in Table 1 by means of a planetary mixer (in Example 2, by melting and kneading the mixture at 100° C.) and then defoaming the mixture under stirring in vacuo for 1 hour. The numerical values in Table 1 are shown in parts by weight.

TABLE 1

| Ingredients | Example | | | | Comparative Example | | |
|---|---|---|---|---|---|---|---|
| | 1 | 2 | 3 | 4 | 1 | 2 | 3 |
| Fine urethane resin particles A | 100 | 100 | | | | | |
| Fine urethane resin particles B | | | 100 | | | | |
| Fine urethane resin particles C | | | | 100 | | | |
| Fine vinyl chloride resin particles | | | | | 100 | | |
| Fine acrylic resin particles | | | | | | 100 | |
| Blocked poly-isocyanate E | | | | | | | 100 |
| Plasticizer | 130 | 100 | 130 | 130 | 130 | 130 | |
| Thermoplastic resin D | | 80 | | | | | |
| Fillers (heavy Ca carbonate) | 100 | 120 | 100 | 100 | 100 | 100 | 100 |
| Additives | | | | | 20 | | |
| Diethylene triamine | | | | | | | 6 |
| Triethylene diamine | | | | | | | 0.4 |

Vinyl chloride resin: A mixture of 50 parts of resin for paste ("Zeon 38J", a product of Nippon Zeon Co., Ltd.) consisting of a vinyl chloride/vinyl acetate copolymer and 50 parts of resin for blend ("Zeon 121", Nippon Zeon Co., Ltd.) consisting of a vinyl chloride/vinyl acetate copolymer.

Fine acrylic resin particles: Polymethacrylate resin having a weight average molecular weight of 1,000,000 and an average particle diameter of 1 μm.

Plasticizer: A phosphate-based plasticizer (2-ethylhexyldiphenyl phosphate with an SP value of 10.0).

Fillers: Heavy calcium carbonate ("NS-100", Nitto Funka Kogyo Co., Ltd.).

Additives: A mixture of 15 parts of calcium oxide (water absorbent) and 5 parts of lead phosphite (stabilizer).

[Evaluation Tests]

Then, the respective compositions prepared with the above formulations in Examples 1 to 4 and Comparative Examples 1 to 3 were examined in the following items.

(Physical Properties of Pastes)

Out of the compositions prepared in the Examples and Comparative Examples, those in the form of sol having fluidity at ordinary temperature were measured for viscosity at 25° C. by a Brookfield type viscometer (20 rpm). The composition in Example 2 was measured for JIS A hardness (25° C.) according to JIS K 6301.

(Adhesiveness)

Each of the prepared compositions in the Examples and Comparative Examples was applied onto a cation electro-deposited metal plate as a test specimen in a method prescribed in JIS K6830 and then baked by heating it at 150° C. for 20 minutes. Then, each specimen was examined in a test for adhesive strength under shear according to a method prescribed under JIS K6830. The evaluation criteria of adhesiveness are as follows:

○: Complete cohesive failure

Δ: Trace destruction where partial interfacial destruction occurred.

×: Complete interfacial destruction (Adhesiveness After Immersion in Hot Water)

Each of the prepared compositions in the Examples and Comparative Examples was applied onto a test specimen and baked in the same manner as above, and each specimen was immersed in hot water at 40° C. for 10 days. Then, it was examined in a test for adhesive strength under shear according to a method prescribed under JIS K6830. The evaluation criteria of adhesiveness are the same as in the adhesiveness described above.

(Low-temperature Bending Test)

Each of the prepared compositions in the Examples and Comparative Examples was hardened by heating it at 140° C. for 30 minutes, maintained in a thermostatic bath at −30° C. for 3 hours and then bent at 180° rapidly (within 2 seconds) to examine its flexibility.

(Mechanical Strength)

Each of the prepared compositions in the Examples and Comparative Examples was hardened by heating it at 140° C. for 30 minutes and then examined for break strength, elongation and hardness (JIS A) at 25° C. according to JIS K6301.

(Storage Stability)

Each of the prepared compositions in the Examples and Comparative Examples was stored at 45° C. for 7 days. The compositions in Examples 3 and 4 and Comparative Examples were measured for BH type viscosity (20 rpm). Each sample was evaluated by calculating the degree of thickening according to the following equation:

$$\text{Degree of thickening} = (\text{viscosity after storage}/\text{initial Viscosity}) \times 100$$

The composition in Example 2 was examined for hardness (JIS A). It was evaluated by calculating the degree of change in hardness according to the following equation:

$$\text{Degree of change in hardness} = (\text{hardness after storage}/\text{initial hardness}) \times 100$$

(Sagging)

A cation electro-deposited metal plate as a test specimen was coated with each of the prepared compositions in the Examples and Comparative Examples such that each composition was applied in the form of a semicircle bead of 10 mm diameter and 100 mm in length thereon, and then the test plate was maintained vertically, heated at 140° C. for 30 minutes, removed, and examined for the distance of sagging.

The test results of each evaluation test above are shown in Table 2.

TABLE 2

| Evaluation items | Example | | | | Comparative Example | | |
|---|---|---|---|---|---|---|---|
| | 1 | 2 | 3 | 4 | 1 | 2 | 3 |
| Physical properties of pastes | | | | | | | |
| Viscosity (cP) | 9,000 | — | 8,000 | 5,000 | 50,000 | 55,000 | 80,000 |
| Hardness (JIS A) | — | 60 | — | — | — | — | — |
| Adhesiveness | ○ | ○ | ○ | ○ | Δ | ○ | ○ |
| Adhesiveness after immersion in hot water | ○ | ○ | ○ | ○ | ○ | ○ | Δ |
| Low-temperature bending test | ○ | ○ | ○ | ○ | ○ | x | x |
| Physical properties of hardened products | | | | | | | |
| Break strength (kgf/cm$^2$) | 40 | 45 | 45 | 40 | 17 | 15 | 50 |
| Elongation (%) | 210 | 180 | 240 | 220 | 130 | 200 | 120 |
| Hardness (JIS A) | 58 | 61 | 64 | 60 | 65 | 57 | 68 |
| Storage stability (%) | 5 | 8 | 15 | 3 | 20 | 500 | 40 |
| Sagging (mm) | 4 | 5 | 3 | 4 | 5 | 30 | 25 |

What is claimed as new and desired to be secured by Letters Patent is:

1. A polyurethane paste composition comprising (A) fine particles of a polyurethane resin having an average particle diameter of 0.1 to 200 μm and a glass transition point of from 30 to 120° C., (B) a plasticizer and (C) a filler, whereby upon heating of the polyurethane paste composition, the particles (A) swell by absorbing plasticizer (B) and are integrated with the filler (C) to form a hardened product, said polyurethane paste composition being in the form of a sol having fluidity at a temperature of 25° C.

2. The composition according to claim 1, wherein (B) has a melting point of 0° C. or less.

3. The composition according to claim 1, wherein the difference between an SP value of the polyurethane resin and an SP value of the plasticezer (B) is from 0 to 2.5.

4. The composition according to claim 1, wherein (B) is 50 to 300 parts by weight and (C) is 1 to 300 parts by weight relative to 100 parts by weight of (A).

5. The composition according to claim 1, wherein not less than 50% of the particles (A) are spherical particles having a ratio of major axis/minor axis in the range of 1.0/1 to 1.5/1.

6. The composition according to claim 1, wherein the polyurethane resin contains urea bonds and has a ratio of urea bonds/urethane bonds in the range of 9/1 to 1/10.

7. The composition according to claim 1, wherein the particles (A) are formed in an aqueous medium.

8. The composition according to claim 7, wherein (A) is obtained by reacting an isocyanate group-terminated urethane prepolymer (a) in an aqueous medium with a chain extender and with or without a terminator and a crosslinking agent.

9. The composition according to claim 8, wherein the chain extender is a blocked fatty diamine.

10. The composition according to claim 1, wherein the sol has a viscosity of 5,000 cP to 300,000 cP at 25° C.

11. The composition of claim 1, wherein the filler (C) is at least one selected from the group consisting of calcium carbonate, kaolin, talc, mica, bentonite, clay, sericite, asbestos, glass fiber, carbon fiber, aramid fiber, nylon fiber, acrylic fiber, glass powder, glass balloon, ceramic balloon, shirasu balloon, coal powder, acrylic resin powder, phenol resin powder, epoxy resin powder, metal powder, ceramic powder, zeolite, slate powder, and asphalt powder.

12. A polyurethane paste composition comprising (A) fine particles of a polyurethane resin having an average particle diameter of 0.1 to 200 μm, (B) a plasticizer and (C) a filler, and at least one shape retaining agent selected from the group consisting of a thermoplastic resin (F) and a crystalline compound (G), said composition having a JIS A hardness of 20 or more at 25° C.

13. The composition of claim 12, wherein the thermoplastic resin (F) is at least one resin selected from the group consisting of polyethylenes, polypropylenes, polystyrenes, poly-p-xylylenes, polyacrylates, polymethacrylates, polyvinyl chlorides, polyvinylidene chlorides, polyvinyl acetates; fluorine-containing resins, polyacrylonitriles, polyvinyl ethers, diene polymers, and copolymers thereof.

14. The composition of claim 12, wherein the thermoplastic resin (F) is at least one resin selected from the group consisting of polyamides, thermoplastic polyesters, polycarbonates, polyphenylene oxides, polysulfones, thermoplastic polyurethanes other than (A), polymers of alkylene oxides, and polyacetals.

15. The composition of claim 12, wherein the crystalline compound (G) is at least one compound selected from the group consisting of wax, polybasic acids, polybasic acid anhydrides, polyvalent metal salts, dimethyl sulfone, camphor and urea.

16. A polyurethane paste composition comprising (A) fine particles having an average particle diameter of 0.1 to 200 μm of a polyurethane resin having a heat-softening point of 80 to 250° C., (B) a plasticizer and (C) a filler.

17. A polyurethane paste composition comprising (A) fine particles of a polyurethane resin having an average particle diameter of 0.1 to 200 μm and a ratio of urea bonds/urethane bonds in the range of 9/1 to 1/10, (B) a plasticizer and (C) a filler.

18. The composition according to claim 17, which further comprises a blocked polyisocyanate (D) in an amount of 0 to 20 parts by weight per 100 parts by weight of (A).

19. A hardened product formed by heating the polyurethane paste composition described in claim 1 until the composition is hardened.

20. The hardened product according to claim 19, having a Tg of from −70° C. to 10° C.

21. A sealing material comprising the composition described in claim 1.

22. An automobile body sealed with the sealing material described in claim 21.

23. A sealing material comprising the composition described in claim 1 carried on a support.

24. An automobile body sealed with the sealing material described in claim 23.

* * * * *

UNITED STATES PATENT AND TRADEMARK OFFICE
CERTIFICATE OF CORRECTION

PATENT NO. : 6,630,534 B1
DATED : October 7, 2003
INVENTOR(S) : Keiji Tanaka et al.

It is certified that error appears in the above-identified patent and that said Letters Patent is hereby corrected as shown below:

Column 13,
Line 38, "plasticezer" should read -- plasticizer --.

Column 14,
Line 34, "acetates;" should read -- acetates, --.

Signed and Sealed this

Ninth Day of March, 2004

JON W. DUDAS
*Acting Director of the United States Patent and Trademark Office*